UNITED STATES PATENT OFFICE.

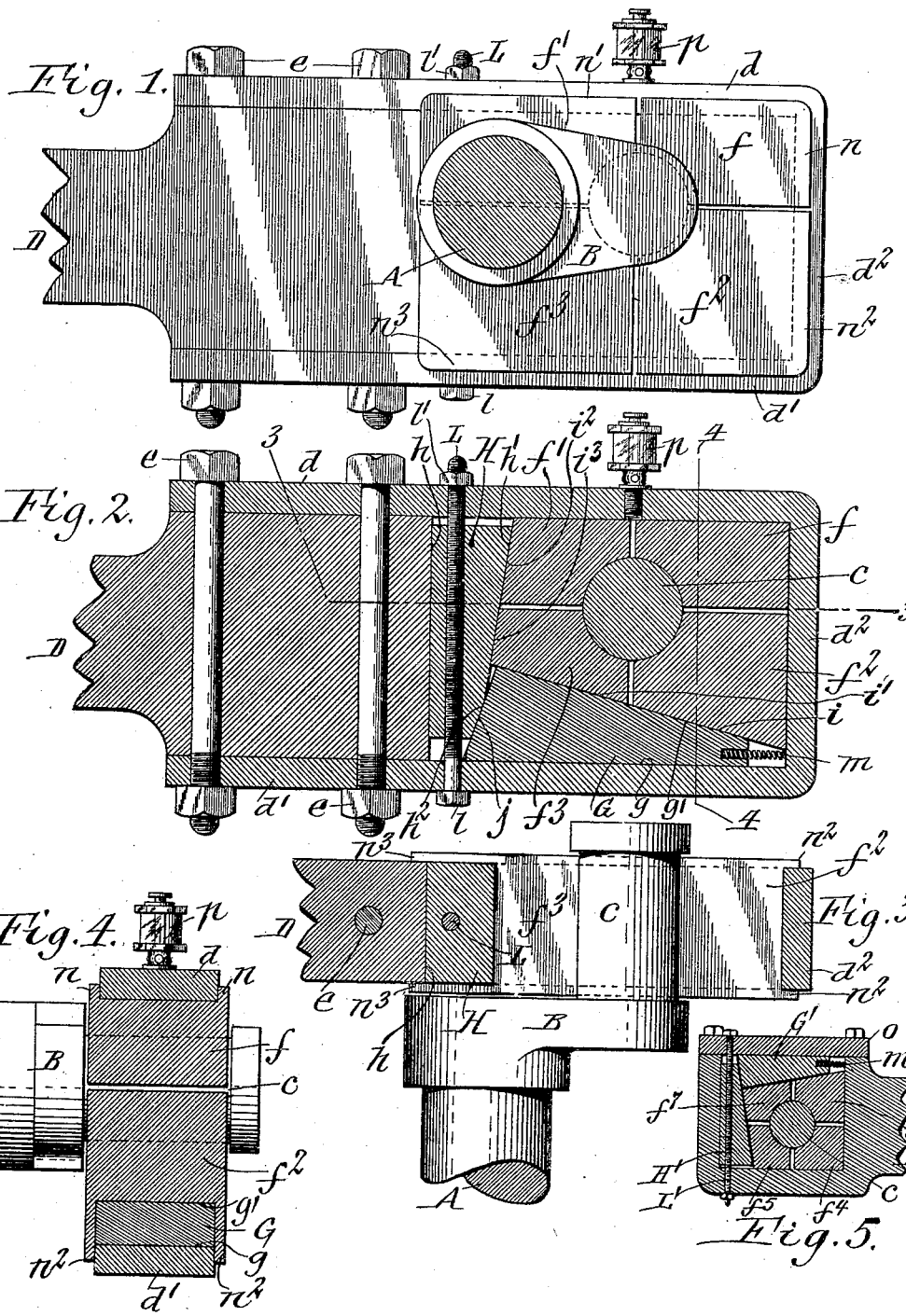

MICHAEL VOLLAND, OF BUFFALO, NEW YORK.

ADJUSTABLE BEARING.

No. 921,571.   Specification of Letters Patent.   Patented May 11, 1909.

Application filed October 12, 1908. Serial No. 457,205.

*To all whom it may concern:*

Be it known that I, MICHAEL VOLLAND, a citizen of the United States, residing at Buffalo, in the county of Erie and State of New York, have invented a new and useful Improvement in Adjustable Bearings, of which the following is a specification.

This invention relates to an adjustable journal box which is more particularly designed for use between a connecting rod and the journal or wrist of a crank shaft but which may also be used for other purposes.

It is the object of this invention to produce a journal box of this character which is very simple in construction and which permits of readily taking up the wear all around the circular contact surfaces of the journal and the bearing pieces engaging therewith.

In the accompanying drawings: Figure 1 is a sectional side elevation showing my improved journal box applied to a connecting rod and crank shaft. Fig. 2 is a vertical longitudinal section thereof. Fig. 3 is a horizontal section in line 3—3, Fig. 2. Fig. 4 is a vertical transverse section on line 4—4, Fig. 2. Fig. 5 is a fragmentary vertical longitudinal section of a connecting rod and crank shaft showing a modification of the construction represented in Figs. 1–4.

Similar letters of reference indicate corresponding parts throughout the several views.

In Figs. 1–4 of the drawings showing the application of my invention A represents a shaft having a crank arm B which is provided at its outer end with a cylindrical journal or wrist $c$ and D represents a connecting rod provided at its end with a U-shaped strap which is secured with its upper and lower arms $d$, $d^1$ to opposite sides of the rod by bolts $e$ and incloses the journal of the crank shaft.

$f$, $f^1$, $f^2$, $f^3$ represent four bearing pieces or sections of a divided bearing which are arranged equidistant around the journal within the space between the strap and connecting rod forming a carrier therefor. These bearing pieces are constructed to form together a cylindrical bearing in which the journal of the crank shaft turns. The bearing piece $f$ engages with its longitudinal outer edge against the inner side of the upper strap arm $d$ while its transverse outer edge engages with the transverse bar or cross piece $d^2$ of the strap. The bearing piece $f^1$ engages with its outer longitudinal edge against the strap arm $d$ and the bearing piece $f^2$ engages with its front transverse edge with the cross piece of the strap.

G represents a longitudinally movable wedge which engages its straight outer longitudinal side $g$ against the inner side of the lower strap arm $d^1$ while its upper inclined side $g^1$ engages with the correspondingly inclined lower longitudinal faces, edges or sides $i$, $i^1$ of the lower bearing pieces $f^2$, $f^3$.

H represents a transversely movable wedge which engages its straight rear side $h$ against the straight transverse front end of the connecting rod while its inclined front side engages with the rear inclined faces, edges or sides $i^2$, $i^3$ of the bearing pieces $f^1$, $f^3$ and also with the inclined rear end face $j$ of the longitudinal wedge. Upon moving the transverse wedge crosswise of the connecting rod and its strap with its narrow end in advance the bearing pieces $f^1$, $f^3$ are moved lengthwise against the journal and the latter in turn is moved against the bearing pieces $f$, $f^2$ which are backed by the cross piece of the strap, thereby adjusting the several bearing pieces lengthwise of the thrust of the connecting rod and taking up any slack or wear which exists in this direction between the bearing pieces and the journal. During its transverse movement the transverse wedge also moves the longitudinal wedge forward lengthwise or toward the narrow end of the latter whereby the same moves the lower bearing pieces $f^2$, $f^3$ upwardly against the journal and the latter against the upper bearing pieces $f$, $f^1$ which are backed by the upper arm $d$ of the strap, thereby adjusting the several bearing pieces transversely of the thrust of the connecting rod and taking up any slack or wear which exists in this direction between the bearing pieces and the journal.

Inasmuch as the wear on the bearing pieces and journal is usually less in the direction of the length of the connecting rod than in a direction transversely thereto the angles of the coöperating inclined surfaces of the wedges and bearing pieces are so determined that the longitudinal wedge during its advancing movement shifts the bearing pieces $f^2$, $f^3$ less than the extent which the bearing pieces $f^1$, $f^2$ are shifted by the transverse wedge during the advancing movement thereof, thereby compensating for the difference in the longitudinal and transverse wear on the bearing pieces and journal. This relative movement of the wedges varies according to the particular character of the work on the machine in which the adjustment is required and can be readily adapted to suit the requirements by providing the transverse wedge on its tail or trailing end with an inclined face $h^1$ which is arranged at one angle for engagement with the correspondingly inclined faces on the bearing pieces $f^1$, $f^3$ while the head or advancing end thereof is provided with an inclined face $h^2$ of an angle different from the tail incline $h^1$ and engaging with the corresponding inclined face $j$ on the tail end of the longitudinal wedge, as shown in Fig. 2. If desired, however, the angle of the inclined face of the transverse wedge may be the same throughout, and the faces on the bearing pieces and longitudinal wedge with which it engages may be of a corresponding angle, as shown in Fig. 5.

The transverse movement of the transverse wedge may be effected in various ways but preferably by means of an adjusting screw L which works in the transverse wedge and is turned at its ends in openings in the bars or arms of the strap and which bears with its head $l$ against the outer side of one strap arm while a jam nut $l^1$ thereon bears against the other strap arm, as shown in Fig. 2. Upon turning the screw L in the proper direction the transverse wedge may be advanced as much as necessary for shifting the bearing pieces into the proper position relatively to the journal of the crank shaft.

During the reciprocating movement of the connecting rod the longitudinal wedge is liable to be advanced too far particularly when the connecting rod is arranged vertically, thereby causing the bearing pieces in contact therewith to be pressed too firmly against the journal and produce unnecessary wear, binding and heating of the parts. To avoid this means are provided to yieldingly resist the advance movement of the longitudinal wedge which means preferably consist of a spring $m$ interposed between the front end of the longitudinal wedge and the cross bar of the strap.

For the purpose of preventing the bearing pieces and wedges from becoming displaced laterally on the connecting rod these bearing pieces $f$, $f^1$, $f^2$, $f^3$ are provided on opposite sides with flanges $n$, $n^1$, $n^2$, $n^3$, respectively, at their outer edges which engage with the opposite sides of the connecting rod and its strap, the flanges of the bearing pieces $f^1$, $f^2$, $f^3$ also embracing the wedges, as shown in Figs. 1, 3 and 4.

In the modified construction of my invention, shown in Fig. 5, the bearing pieces $f^4$, $f^5$, $f^6$, $f^7$, wedges $G^1$, $H^1$, adjusting screw $L^1$ and resisting spring $m^1$ are arranged in a laterally opening recess at the end of the connecting rod the mouth of which is closed by a strap $o$ which receives one end of the adjusting screw. Any suitable means may be provided for lubricating the journal box that shown in the drawings being an oil cup $p$ which is secured to the upper bar or arm of the strap in position to deliver oil into the space between the upper bearing pieces $f$, $f^1$ which leads to the wearing surfaces of the journal box. Inasmuch as the advancing movement of the longitudinal wedge is effected automatically during the advancing movement of the transverse wedge it will be apparent that the tightening of the adjusting screw will cause the slack or wear to be taken up simultaneously in a direction lengthwise as well as transversely of the stroke of the connecting rod.

I claim as my invention:

1. An adjustable journal box comprising a plurality of bearing pieces adapted to engage with different parts of a journal, a wedge engaging some of said bearing pieces for moving the same toward said journal in one direction, and another wedge engaging with others of the bearing pieces for moving the same in another direction toward said journal and also engaging with the first mentioned wedge for actuating the same, the parts being so constructed that the effective movement of one wedge and the bearing pieces coöperating therewith is greater than the effective movement of the other wedge and the bearing pieces coöperating therewith.

2. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, and a transverse wedge provided on its inner side with an inclined face engaging with corresponding faces on others of said bearing pieces for moving the same in another direction and also engaging with the inclined end face of the longitudinal wedge.

3. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, and a transverse wedge provided on its inner side with an inclined face engaging with corresponding faces on others of said bearing pieces for moving the same in another direction and also engaging with the inclined end face of the longitudinal wedge, the coöperating faces of the wedges being of a different angle than the angle of the coöperating faces of the transverse wedge and the opposing bearing pieces.

4. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, a transverse wedge provided on its inner side with an inclined face engaging with corresponding faces on others of said bearing pieces for moving the same in another direction and also engaging with the inclined end face of the longitudinal wedge and an adjusting screw for shifting the wedge which engages its companion bearing pieces and the first mentioned wedge.

5. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, and a transverse wedge provided on its inner side with an inclined face engaging with corresponding faces on others of said bearing pieces for moving the same in another direction and also engaging with the inclined end face of the longitudinal wedge and a spring which restrains the forward movement of the first mentioned wedge.

6. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, and a transverse wedge provided on its inner side with an inclined face engaging with the corresponding faces on others of said bearing pieces for moving the same in another direction and also engaging with the inclined end face of the longitudinal wedge, an adjusting screw for effecting the movement of the last-mentioned wedge, a spring which restrains the forward movement of the first mentioned wedge and a support for said bearing pieces, wedges, adjusting screw and spring.

7. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, a transverse wedge provided on its inner side with an inclined face engaging with corresponding faces on others of said bearing pieces for moving the same in another direction and also engaging with the inclined end face of the longitudinal wedge and a support for said bearing pieces and wedges, said bearing pieces having flanges which engage with said support.

8. An adjustable journal box comprising a plurality of bearing pieces adapted to engage with different parts of a journal, a longitudinal wedge provided on its inner side with an inclined face which engages correspondingly inclined faces on some of said bearing pieces for moving the same in one direction and also provided at one of its ends with an inclined face, a transverse wedge provided on its inner side with an inclined face engaging with corresponding faces on others of said bearing pieces for moving the same in another direction and also engaging with the inclined end face of the longitudinal wedge and a support for said bearing pieces and wedges, said bearing pieces having flanges which engage with said support and the flanges of some of said bearing pieces embracing said wedges.

Witness my hand this 10th day of October, 1908.

MICHAEL VOLLAND.

Witnesses:
 THEO. L. POPP,
 ANNA HEIGIS.